United States Patent [19]

Egler et al.

[11] Patent Number: 4,750,462
[45] Date of Patent: Jun. 14, 1988

[54] FUEL INJECTION APPARATUS FOR INTERNAL COMBUSTION ENGINES

[75] Inventors: Walter Egler, Stuttgart, Fed. Rep. of Germany; Jean Leblanc, Lyon, France; Helmut Pfeifle, Stuttgart, Fed. Rep. of Germany; Jean Pigeroulet, Villeurbanne; Francois Rossignol, Mornant, both of France; Dietrich Trachte, Campinas, Brazil

[73] Assignee: Robert Bosch GmbH, Stuttgart, Fed. Rep. of Germany

[21] Appl. No.: 873,002

[22] Filed: Jun. 11, 1986

[30] Foreign Application Priority Data

Jun. 14, 1985 [DE] Fed. Rep. of Germany ....... 3521428

[51] Int. Cl.⁴ .......................................... F02M 39/00
[52] U.S. Cl. ................................... 123/467; 123/447; 239/88
[58] Field of Search .............. 123/467, 447, 446, 458; 239/88, 89, 90, 91, 92, 93, 94, 95, 533.1–533.12

[56] References Cited

U.S. PATENT DOCUMENTS

| | | | |
|---|---|---|---|
| 2,628,570 | 2/1953 | de Luca | 103/154 |
| 2,950,709 | 8/1960 | Dessiere | 123/446 |
| 3,115,304 | 12/1963 | Humphries | 239/90 |
| 3,796,206 | 3/1974 | Links | 123/139 |
| 3,810,453 | 5/1974 | Wolee | 123/467 |
| 3,818,882 | 6/1974 | Leondo | 123/467 |
| 4,158,442 | 6/1979 | Rathmayr | 239/88 |
| 4,317,541 | 3/1982 | Beadmore | 239/88 |
| 4,408,586 | 11/1983 | Van Rinsum | 123/446 |
| 4,526,149 | 7/1985 | Hafele | 123/447 |
| 4,527,737 | 7/1985 | Deckard | 239/89 |
| 4,571,161 | 2/1986 | Leblanc | 123/503 |

Primary Examiner—Carl Stuart Miller
Attorney, Agent, or Firm—Edwin E. Greigg

[57] ABSTRACT

A fuel injection apparatus which the termination of the effective pump supply stroke is effected by exposing a relief conduit with the aid of a valve having for instance a control edge, whereupon a highly pressurized fuel flows out via the relief conduit and is directed into a pressure chamber defined by a rear face of a pressure valve closing member. The pressure valve closing member is located in a connection with a fuel injection line that leads from the pump work chamber to the fuel injection valve and is acted upon by a valve spring to effect closing of this injection line. The impact of fuel that reaches the pressure chamber via the releif conduit reinforces a fast closure of the pressure valve closing member at the end of injection, which leads to an abrupt termination of an injection cycle. In addition, or altenatively, the fuel injection valve closing member can also be acted upon by the impact of fuel diversion.

26 Claims, 4 Drawing Sheets

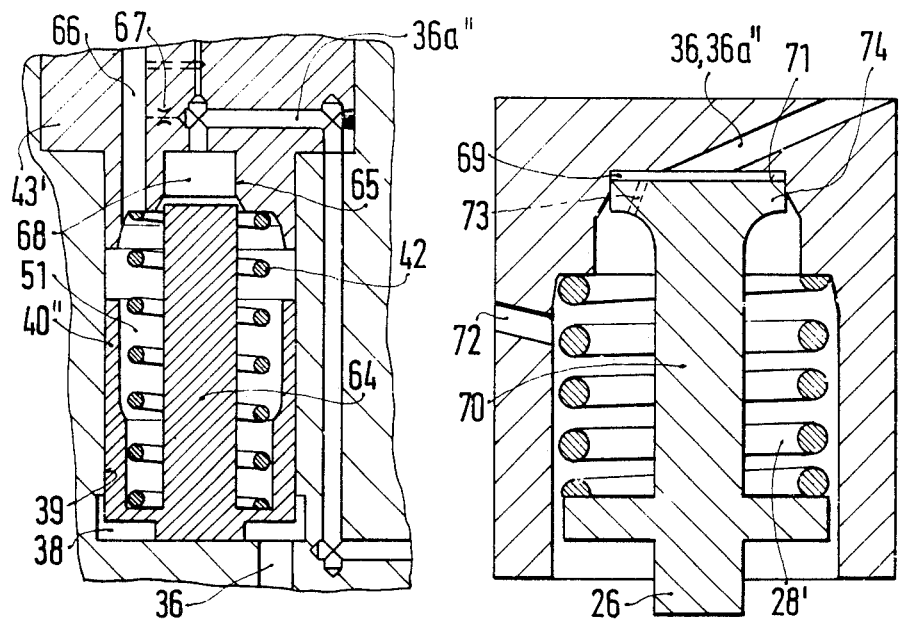
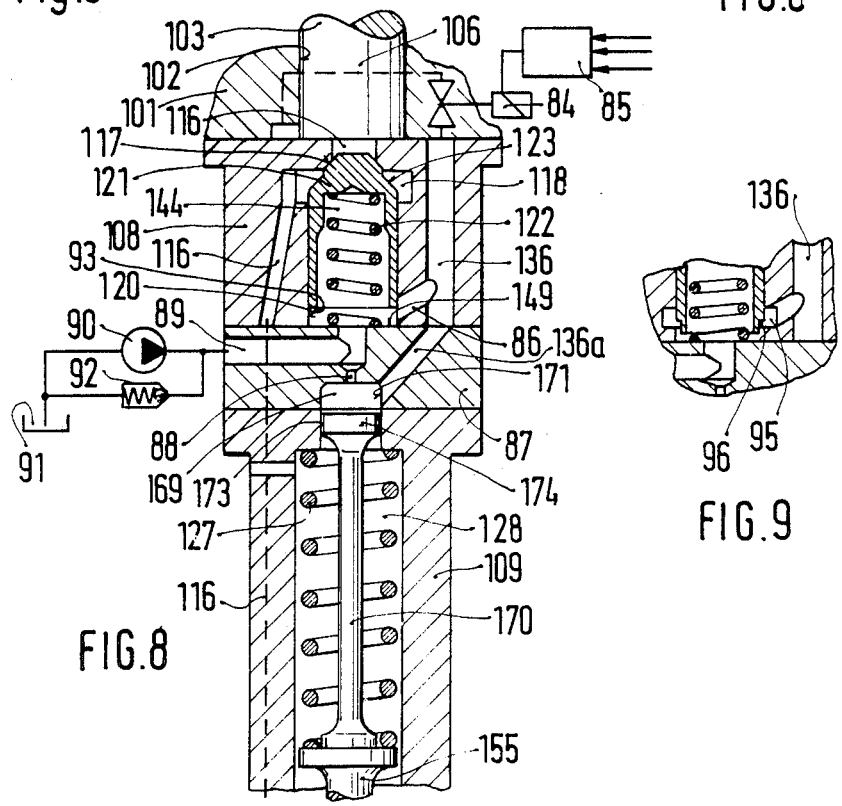

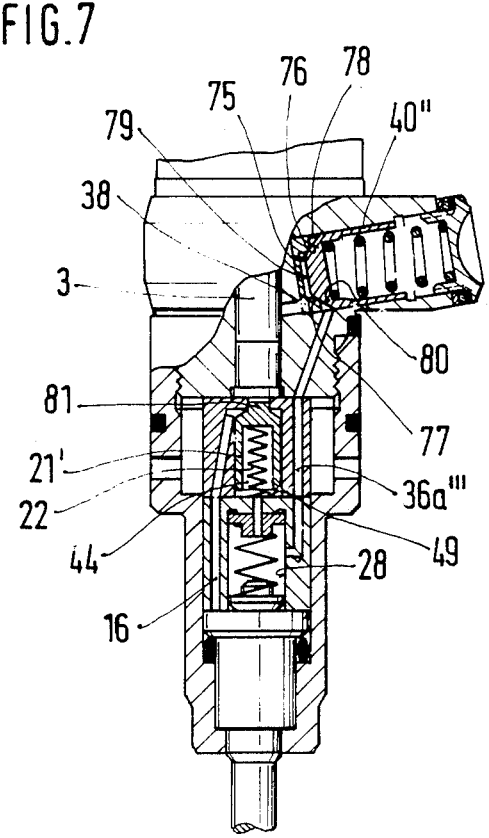

FUEL INJECTION APPARATUS FOR INTERNAL COMBUSTION ENGINES

BACKGROUND OF THE INVENTION

The invention is directed to improvements in valves and in the behavior of their valve closing members.

In a fuel injection apparatus of this kind, such as that disclosed in Austrian Pat. No. 312 368, the valve comprises a slide valve, and the pump piston serves as the movable valve closing member, which with an oblique control edge on its jacket face causes the outlet of the relief conduit on the circumferential wall of the pump cylinder to communicate with the pump work chamber beyond a pump supply stroke defined by the rotational position of the pump piston. In this manner, the rotational position of the pump piston determines the amount of fuel injected at high pressure per pumping stroke.

This kind of fuel injection apparatus also includes unit fuel injectors, which combine a fuel injection pump and a fuel injection valve with a very short pressure line of stable shape located between the pump work chamber and the injection valve opening. Unit fuel injectors are used to attain accurate injection even with very high-speed internal combustion engines that operate with direct injection into the combustion chambers. In this case, to attain good fuel preparation given the very short period of time that is available for ignition delay and combustion of the fuel that has been introduced, accurate and very fast control of the injection valve closing members must be assured, and the apparatus must also operate at an elevated injection pressure in order to better atomize the introduced fuel.

In the known fuel injection apparatus, there are limits to the closing speed of the valve closing member, because of the dynamic behavior of the fuel and because of the problems in attaining large relief cross sections, for the sake of a rapid decrease in pressure at the end of injection, and in attaining large spring closing forces. The closing behavior, and at the same time the opening characteristic of the valve, must be taken into account.

In the known apparatus, a particular problem is that the desired characteristic curve of the course of injection cannot be attained at the instant of the end of injection; this desired characteristic would assure that substantially all the fuel metered for fuel injection, in particular in the final phase of injection, would come to be injected at the high injection pressure that is required for good atomization or fuel preparation. Rapid relief of pressure, which is intended to end the injection, is associated with high-amplitude pressure wave formation, cavitation damage, and late injections, caused by pressure wave peak pressures, that occur after the desired end of injection. As is well known, the pressure wave peak pressures must be reduced by appropriately designed pressure valves, but these valves exhibit widely varying behavior over the entire operating range of the engine.

It is also known, from German Offenlegungsschrift No. 2 301 419, to have the above-mentioned oblique control edge on the pump piston open up a connecting conduit to the spring chamber of the injection valve closing member, before it effects communication with the relief conduit. However, in order to prevent blockage of the pressure piston in the stroke portion between the opening of the connecting conduit and the opening of the relief conduit, a pressure maintenance valve is also required, by way of which fuel may flow out in an uncontrollable quantity. This arrangement is intended to attain rapid closure of the valve closing member of the injection valve at the end of fuel supply.

Another feature of this embodiment is a housing separation between the injection pump and the injection valve, which communicate with one another via pressure tube lines. At the moment of the intended end of injection, no substantial relief of the pump work chamber takes place yet, because relief is effected only via the compressibility of the spring chamber volume, if need be via the opening characteristic of the pressure maintenance valve. Only the force of the injection valve spring then acts in the closing direction, because the valve closing member is balanced in pressure. Because of the time delay in relief of the pump work chamber via the relief conduit, this embodiment must also be expected to have a relatively slow closure, possibly in increments, of the valve needle.

OBJECT AND SUMMARY OF THE INVENTION

A principal object of the fuel injection apparatus according to the invention and having the advantage over the prior art is that at the same time as the geometric end of injection, when the relief conduit is opened by the control edge of the pump piston or by the valve, pressurized fuel acts upon the pressure valve closing member as well, reinforcing the action of the valve spring. This action has the advantage that fuel supply to the fuel injection valve opening can be interrupted abruptly, at a location near the pump work chamber. By embodying the pressure valve closing member with a pressure shoulder, on the one hand this member is able during the intervals between injections, in its function as an equalizing pressure valve, to reduce the pressure waves, or their peaks, that flow back and forth between the injection valve opening location and the pressure valve; and on the other hand, at the injection onset, by means of the incremental action exerted on the pressure faces and by means of the displacement volume of the cylindrical body of this member, it can generate a gently increasing course of injection, one that is appropriate given the injection delay. This has a favorable effect on exhaust emissions resulting from combustion.

It is another object of the invention that the diverted quantity flowing via the relief conduit can also be introduced into a storage chamber, the reception rate of which can be affected dyamically by restoring forces, on the one hand, and hydraulic forces, on the other. At the instant of the end of injection, the fuel flowing via the relief conduit becomes fully effective dynamically at the pressure valve in such a way as to increase the closing force applied to the valve. This ensuing supply of fuel into the chamber receiving the pressure valve closing spring is received by the storage space, thereby avoiding putting overly great pressure on the pressure valve. This storage space, by cooperating in a known manner with the fuel metering valve embodied particularly as a magnetic valve and in cooperation with the rotational control of the pump piston, offers the further opportunity of controlling both the injection onset and the fuel quantity; the control edge of the pump piston then controls the end of injection, and the filling of the pump work chamber via the magnetic valve controls the injection onset and the injection quantity.

It is a further object to provide the advantage of a very accurate, fast-acting control of fuel quantity and instant of injection, which furthermore has the advantage of attaining a fast, abrupt end of injection together with an injection course at injection onset that is adapted to requirements for smooth running and economy of operation. This makes the fuel injection apparatus according to the invention particularly suitable for high-speed engines operating with direct injection and high atomization pressures.

It is yet another object of the invention that directly at the time of opening of the relief conduit, without delay, the valve closing member of the fuel injection valve is subjected to the fuel that is still at injection pressure in the pump work chamber. The injection line is relieved at the same time.

It is still another object of the invention to provide an arrangement which still further improves the closing behavior by precluding the damaging effect of vibrational states in the connection between the pump work chamber and the injection valve opening and to avoid an overload of the pressure chamber.

It is an additional object that direct relief in the pressure chamber be provided as well as the previous advantages mentioned so that at the injection onset, the volume that is positively displaced by the valve closing member of the injection valve and by the pressure valve closing member is received by the storage chamber, which returns this fuel quantity to the pump work chamber further increasing the accuracy of injection. All losses due to leakage, such as those associated with the injection valve closing member guidance element, for instance, are returned back to the pump work chamber, so that a better approximation of the theoretically horizontal characteristic curve for the fuel quantity can be maintained over the operating range of the engine.

It is still a further object that the injection rate can be varied by controlling the opening movement of the pressure valve closing member and of the injection valve closing member by means of the reservoir-maintained pressure applied to the rear side thereof.

It is yet an additional object that the volume encompassing the pressure chamber and the space enclosed by the pressure valve closing member is advantageously uncoupled from the pump work chamber, especially in the metering phase and the supply phase, so that this volume cannot act as a source of harmful vibrations. This volume can also be maintained with an unvariedly high pressure, without creating a hollow space—during the intake stroke of the pump piston—and without cavitation.

Still another object of the invention offers further advantageous, very cost-beneficial results, which can be still further improved by maintaining constant pressure behind the pressure valve closing member or injection valve closing member so that the volume positively displaced by these members can be delivered at the onset of injection to the reservoir, which closes this connection at the intake stroke.

It is still an added object that with the aid of the diversion impact that acts in the closing direction of the injection valve closing member, fast closure of the injection valve closing member is attainable even in a fuel injection apparatus in which the effective supply stroke of the pump piston and at the same time the injection onset are determined with the aid of an electrically controlled valve disposed in a fill and relief line of the pump work chamber.

The invention will be better understood and further embodiments and advantages thereof will become more apparent from the ensuing detailed description of preferred embodiments taken in conjunction with the drawings.

BRIEF DESCRIPTION OF THE DRAWINGS

FIG. 5 shows a fourth exemplary embodiment of the invention, with a modification of the exemplary embodiment of FIG. 4 such that the reservoir piston moves a smaller piston, which in the course of the deflection movement of the reservoir piston pumps fuel to the valve closing member of the injection valve;

FIG. 6 shows a fifth exemplary embodiment of the invention with a particular form of pressure exertion upon the valve closing member of the injection valve;

FIG. 7 shows a sixth exemplary embodiment of the invention having a reservoir piston that has graduated pressure stage faces;

FIG. 8 shows a seventh exemplary embodiment of the invention applied to a unit fuel injector the pressure phase of which is controlled by a magnetic valve; and FIG. 9 shows a detail of a unit fuel injector having a variant feature as compared with FIG. 8.

DESCRIPTION OF THE PREFERRED EMBODIMENTS

Figure 1:
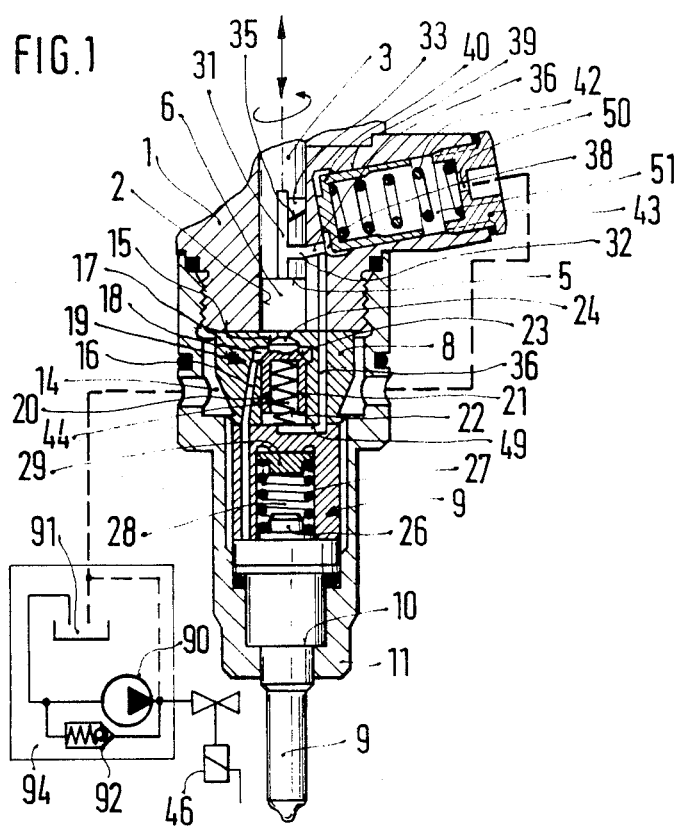
FIG. 1 is a sectional view of a first exemplary embodiment showing the portions of a unit fuel injector that are essential to the invention.

A unitary fuel injector, as an example of a fuel injection apparatus, is shown in fragmentary section in FIG. 1; parts not essential to an understanding of the invention have been omitted from the drawing. In a pump housing 1, a pump cylinder 2 is provided, in which a pump piston 3 is set into reciprocating pumping motion by a drive cam in a manner not shown here. With its end face 5, the pump piston encloses a pump work chamber within the pump cylinder 2 that is closed at its end face. The end closure of the pump cylinder 2 is effected via an intermediate piece 8, which is adjoined by an axial aligned fuel injection valve 9 that is pressed tightly against the intermediate piece 8 by a retaining nut 11 engaging a shoulder 10 of the fuel injection valve, thereby forming the housing unit of the unit fuel injector. The retaining nut 11 is screws to the pump housing 1 and in its interior the retaining nut 11 and the jacket face of the intermediate piece 8 form a lowpressure chamber 14, which communicates with the fuel supply source 94, which in this case has a fuel supply tank 91, from which a fuel feed pump 90, to which a pressure control valve 92 may also be connected in parallel, aspirates fuel.

An injection line 16 leads away from the end face 15 of the pump cylinder 2, the flow cross section of this line 16 being defined directly adjacent to the pump work chamber by a conically formed valve seat 17 of a pressure valve 19. Adjacent to this valve seat, the injection line discharges into an annular chamber 18, from which its further course leads through the intermediate piece 8 to the injection valve 9 in a known manner.

The outlet of the injection line from the pump work chamber and the valve seat are located coaxially with the pump piston axis. The chamber 18 is adjoined coaxially by a guide cylinder 20, having a diameter that is larger than the largest diameter of the conical valve seat 17. A pressure valve closing member 21 of the pressure valve 19 is tightly fitting but displaceable in the guide cylinder, being pre-loaded on a rear extremity by a valve spring 22 that is supported on the end face of the guide cylinder. The cylindrical pressure valve closing member 21 protrudes into the chamber 18, where it forms a pressure shoulder 23 and tapers into a tang 24, which has a conical sealing face that corresponds to the valve seat 17. The pressure valve closing member is retained on the valve seat 17 by the valve spring and thereby closes off the communication afforded by the injection line between the pump work chamber 6 and the injection valve 9.

Figure 3:
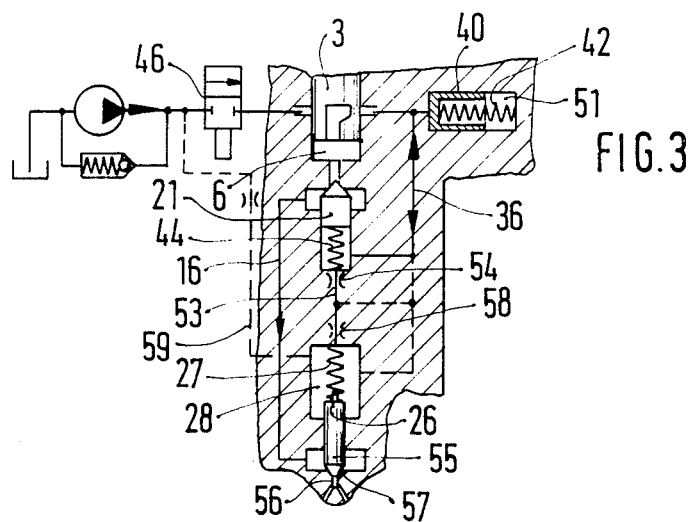
FIG. 3 shows a second exemplary embodiment of the invention, in a schematic view including variant features.

Referring to the embodiment of FIG. 3 only by way of example, the injection valve has in a known manner an inwardly opening valve needle, which has a pressure shoulder 57 toward which the fuel that has been put under high pressure is directed via the injection line 16; by this means, the valve needle is actuatable in the opening direction. Referring again to FIG. 1, there is acting on the valve needle in the clsing direction, via a spring plate 26 located at the end of the valve needle, the force of a biased valve closing spring 27, which is disposed in a spring chamber 28 of the injection valve and on its opposite end is supported via a spring plate 29 on the end face of the spring chamber 28. The cylindrically embodied spring chamber 28, like the axis of the valve needle of the injection valve, is coaxial with the axis of the pump piston 3.

The pump piston has a longitudinal groove 31 in its jacket face, joining the pump work chamber and a full or partial annular groove 32. The longitudinal groove 31 also joins the pump work chamber with a recess 33 in the jacket face of the pump piston, which on the side remote from the pump work chamber has a limiting edge formed at right angles to the pump piston axis, and toward the pump work chamber has an obliquely extending limiting edge 35 embodied as a control edge. In the end position of the pump piston, which is at the end of the intake stroke (bottom dead center), the partial annular groove 32 communicates with the opening of relief conduit 36, which leads from the pump cylinder 2 in a storage chamber 38.

This chamber comprises a cylinder 39, in which a piston 40, acting as a movable wall, is disposed in a tightly fitting but displaceable manner. A compression spring 42 is supported on the rear interior end of the piston 40; on its other end, the spring 42 is supported on a closure plug 43 that closes the cylinder 39. The relief conduit 36 leads from the storage chamber on through the pump housing 1 and the intermediate piece 8 as far as the interior of the intermediate chamber 44 enclosed in the guide cylinder 20 by a rear extremity of the valve closing member 21. The valve spring 22 is also disposed in this intermediate chamber 44.

Figure 2:
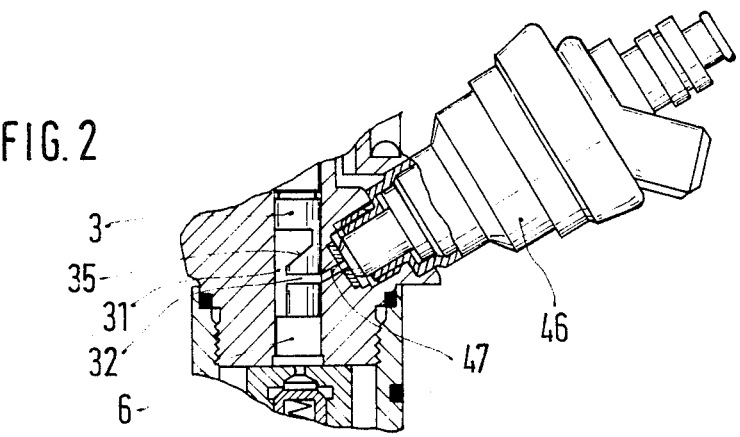
FIG. 2 is a second sectional view, at an angle offset rotationally from the first, through the same unit fuel injector.

In FIG. 2, which shows a section offset in its rotational position as compared with that of FIG. 1 and taken again through the exemplary embodiment of FIG. 1, a magnetic valve 46 is shown, which via its closing members, not shown in further detail here, controls the communication between a fuel supply line 47 and the fuel supply source 94. The fuel supply line 47 discharges into the cylinder 2 in the vicinity of the partial annular groove 32, whenever the pump piston 3 is located at the end of its intake stroke in the bottom dead center position shown.

During operation, in the case of the unit fuel injector shown in FIG. 1, the pump piston 3 is set into reciprocating pumping motion. In the initial bottom dead center position shown, the piston 40, which with cylinder 39 defines the storage chamber 38, has introduced the contents of this chamber 38 into the pump work chamber 6. In addition, via the magnetic valve, a predetermined fuel quantity has been metered into the pump work chamber 6. In the ensuing pumping stroke of the pump piston, the relief conduit 36 is closed by the jacket face of the pump piston, and remains closed until such time as it is reopened by the oblique control edge 35. In the stroke taking place in the interim, the pump piston pumps the positively displaced fuel at high pressure into the injection line 16, whereupon the pressure valve closing member 21 is forced from its seat. The injection pressure engaging the valve needle opens the fuel injection valve.

At the moment when the relief conduit 36 is opened by the control edge 35, the fuel flows, simultaneously expanding, into the storage chamber 38. The pressure that builds up there is determined by the tension in compression spring 42. Via the relief conduit 36, the fuel is additionally pumped into the intermediate chamber 44. The fuel that has reached this far is still at a very high pressure level, which has the effect of considerably augmenting the forces acting in the closing direction of the pressure valve closing member 21, moving this member into the closing position. At this moment, the pumping of fuel from the pump work chamber 6 into the injection line 16, or to the opening of the injection valve, is interrupted. The peaks of the pressure waves subsequently flowing back and forth in the region between the valve seat 17 and the injection valve needle when the injection valve closes can be diminished in that the pressure valve closing member, being strained on its pressure shoulder 23, opens once again and relieves the injection line 16 back toward the pump work chamber 6, which is now at a lower pressure level. This pressure level is determined by the spring force engaging the piston 40 and is notably lower than the injection pressure, but higher than the pressure of the fuel supply source. The closing process of the pressure valve closing member 21 is improved by the fact that at the first instant of triggering, a diversion impact of the fuel, which has been compressed to a high pressure of over 1000 bar, reaches the intermediate chamber 44. The piston 40, urged by an increased restoring force, and the spring 42 together having sufficiently high inertia that the diversion impact is substantially exerted upon the pressure valve closing member 21.

Until the end of the supply stroke movement of the pump piston, the fuel that continues to be positively displaced after the relief conduit opening has been covered is pumped into the storage chamber 38. In the ensuing intake stroke, first a portion of this remaining positively displaced fuel is pumped back into the pump work chamber, as long as the mouth of the relieve conduit is located in the vicinity of the recess 33; on the contrary, the rest of the stored fuel at bottom dead center is pumped into the pump work chamber via the partial annular groove 32. At the instant when this last-mentioned communication is established, the pressure level in the pump work chamber has dropped considerably, which promotes the transfer of fuel from the storage chamber 38. The quantity of fuel introduced in this way into the pump work chamber is determined by the rotational position of the pump piston, or by the stroke beyond which the relief conduit is uncovered by the oblique control edge. Subsequently or at the same time, the quantity of fuel intended for the next fuel injection event is metered via the magnetic valve. Together with the fuel quantity already located in the pump work chamber, then, this defines the injection onset as the instant at which the pressure of the pump work chamber has increased to such an extent that the opening pressure of the injection valve has been attained. With this type of unit fuel injector, the rotational position of the pump piston thus determines the end of injection and simultaneously the onset of injection, with a constant fuel metering quantity via the magnetic valve. With the aid of the magnetic valve, the quantity of fuel attaining injection per pump stroke is determined and the injection onset is varied at the same time.

By introducing the fuel diversion quantity at the end of the effective supply stroke of the pump piston into the intermediate chamber 44, an extremely fast interruption of the fuel injection is attained at the desired end of injection. This is particularly true in the sense of providing a steep drop in the injection rate at the end of injection, so that until the end of injection the maximum fuel injection pressure is available, and a very accurate control time can be attained. At injection onset, on the contrary, in order to initiate fuel injection the pressure valve closing member must be moved out of its closing position. To do so, first a small pressure face acts upon the valve closing member to the extent of the size of the flow cross section of the injection line nearest the pump work chamber. Once the valve closing member has risen from the valve seat 17, however, the fuel pressure is exerted upon the entire cross section, which brings about a notably faster deflection of the pressure valve closing member 21. This factor accordingly makes a displacement volume availalbe for use; initially, this slows down the further rise in fuel pressure which is associated with a lower injection rate; however, this is entirely compatible with the principle of an initially delayed introduction of fuel into the combustion chamber, since at injection onset an ignition delay period must be expected. Thus an overly large quantity of fuel is prevented from igniting abruptly toward the end of this delay period, which would cause undesirable combustion noise (knocking or pinging).

The deflection stroke of the pressure valve closing member 21 is determined by its stop 49 at the end of the guide cylinder 20. The stroke of the pressure valve closing member is adapted to the goals desired to be attained. The fuel volume that is positively displaced during the opening of the pressure valve closing member is returned to the storage chamber 38. This characteristic of the storage means then also determines the deflection speed of the pressure valve closing member, because during its deflection this member compresses fuel at its rear face. The pressure that comes to be established is determined by the piston 40 of the storage means. Accordingly, it becomes possible to intervene in the course of injection at injection onset. The dynamic behavor of the piston 40 can be further controlled by providing that fuel pressure is exerted upon the rear face of the piston 40. It is particualary advantageous to join the chamber 51 located at the rear face of the piston 40 and receiving the compression spring 42 with the low-pressure side of the fuel supply via a throttle restriction 50. In this way, the chamber 51, for instance, can also communicate with the low-pressure chamber 14, which is relieved in favor of the fuel supply tank or the intake side of the fuel supply pump, or else it may communicate with a pressure source having a controlled pressure level.

In FIG. 3, further embodiments and variants of the exemplary embodiment of FIGS. 1 and 2 are shown in a schematic arrangement. Identical elements have the same reference numerals. The essential difference from FIG. 1 is that the intermediate chamber 44 that is enclosed by the pressure valve closing member 21 communicates via a pressure line 53 with the spring chamber 28. For gradual coupling with the spring chamber 28, a throttle 54 can also be provided in the pressure line 53. As in the first exemplary embodiment, the relief conduit 36 discharges into the intermediate chamber 44. The diversion impact after the relief conduit is opened by the pump piston thus reaches both the intermediate chamber 44 and the spring chamber 28, and as a result there is an early, fast closure of the pressure valve 19 attained, but also increase in the closing force at the injection valve closing member 55, because the pressure prevailing in the spring chamber 28 then acts on the end face of the injection valve closing member, optionally via the interposed spring plate 26. The increased closing force effects a very fast closure of the injection port 56. The other functions and advantages explained for the exemplary embodiment of FIGS. 1 and 2 apply to the embodiment of FIG. 3 as well.

Instead of having the relief conduit discharge directly into the intermediate chamber 44, the relief conduit may instead discharge into the spring chamber 28 or pressure line 53, as indicated by dashed lines in FIG. 3. The spring chamber may advantageously communicate, via a throttled connection 59—as compared with the inflow cross section—with the low-pressure side or the low-pressure chamber 14 (not shown), which produces a scavenging effect. Optionally, with the last variant an additional throttle 58 may also be disposed in the line 53, together with the throttle 54 varying the dynamic effect of the diversion impact in the spring chamber 28 and in the chamber 44.

Figure 4:
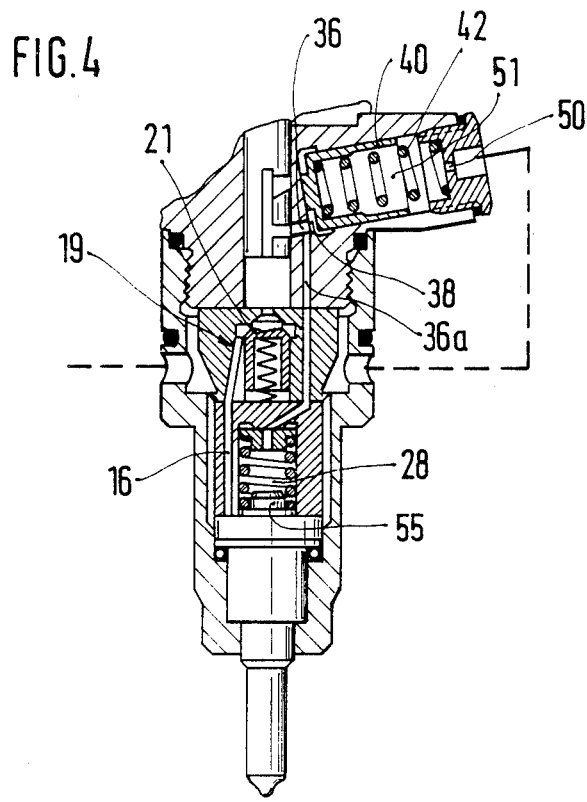
FIG. 4 shows a third exemplary embodiment of the invention in terms of a unit fuel injector of the same type as in FIG. 1, but having an overflow reservoir acting at the same time as a piston for exerting pressure upon the spring chamber of the injection nozzle portion thereof.

The exemplary embodiment of FIG. 4 relates to a unit fuel injector similar to the exemplary embodiment of FIG. 1. Here, substantially identical elements are used, except that the relief conduit 36 terminates in the storage chamber 38. The chamber 52 is again enclosed on the rear face of the storage piston 40, but now it leads via a pressure line 36a, which branches off as an extension of the relief conduit 36 and leads to the spring chamber 28 of the fuel injection valve. In this exemplary embodiment, only the injection valve closing member 55 is acted upon in the closing direction by the diversion impact; the pressure valve 19, on the other hand, still functions in the usual manner.

The special feature attained with the arrangement is an increase in closing pressure at the end of injection; there is a hydraulic separation between the relief conduit 36 and the relief conduit extension 36a or the spring chamber 28 for the sake of accurate metering. Thus although the diversion impact does reach the spring chamber, this chamber, being a dead volume, is disengaged during the phase in which fuel is reaspirated into the pump work chamber during the intake stroke of the pump piston. The hydraulic chambers, which include the chamber 51 and the chamber 28, are equalized in pressure at the instant at which the relief conduit 36 is uncovered; a throttle connection 50 to a low-pressure chamber can be used for this purpose, as shown in FIG. 1.

With this arrangement, once again a fast closure of the injection valve at the end of supply is attained; accordingly, a good course of injection at high injection pressure over the supply period and in particular a high injection rate at the end of injection are attained as well. The severe load on the injection valve closing member in the closing direction also assures that there will be no after injections caused by reflected pressure waves in the injection line 16. Diminishing these pressure waves has the further effect of improving the closure of the pressure valve closing member 21, as in the exemplary embodiment of FIG. 1. Because of the extension of pressure via the piston 40 at the instant of diversion via the relief conduit 36. overswing of the piston, which would otherwise occur because of its being fully relieved, is also prevented, resulting in a lowering of the stress on the compression spring 42 of the storage means. At the same time, cavitation in the pressure chambers defined by the piston 40 is avoided.

The volumetric disengagement via the piston 40 as shown in FIG. 4 can naturally be applied to the embodiments shown in FIGS. 1-3 as well, where pressure is exerted on the spring chamber and on the intermediate chamber 44 enclosed by the valve closing member. Thus the advantages of disengaging the dead volume behind the piston 40 as described in connection with those embodiments can be attained here as well.

A variant of the embodiment of FIG. 4 is represented by the piston 40" of the embodiment of FIG. 5. The piston 40" is again tightly fitting but displaceable in the cylinder 39 and with one end face it defines the storage chamber 38 within this cylinder; the chamber 38 communicates via the relief conduit 36 with the pump cylinder 2. The rear interior face of the storage piston 40" is again acted upon by the compression spring 42, which is supported on the end face of the closure element 43' that encloses the cylinder 39. The storage piston 40" is cup-shaped and on the rear interior face thereof acted upon by the spring 42 it has a piston 64 extending coaxially with the axis of the storage piston. The piston 64 is surrounded by the compression spring 42 and cooperates with a working cylinder 65, disposed in the enclosure element 43', and therewith defines a work chamber 68. In the position of repose of the storage piston 40' shown, the pistion 64 is located outwardly of the working cylinder 65. As a result, the adjoining pressure chamber 51 can be relieved during the opening stroke of the injection valve closing member, so that a pressure that would hinder the opening stroke does not build up therein.

Upon deflection, the piston 64 positively displaces the fuel contained in the working cylinder 65. This fuel can flow via a continuing relief conduit 36a" to the pressure chambers, the spring chamber 28 and/or the intermediate chamber 44 of FIG. 1, 3 or 4. The chamber 51 enclosed by the rear side of the storage piston 40" communicates via a line 66 with a fuel source at low pressure, similarly to what has been described in conjunction with FIG. 1. The work chamber 68 enclosed by the piston 64 can also communicate via a throttle 67 with the low-pressure chamber as well, or with the chamber 51. The throttle, as shown in FIG. 5, may be located in a connecting line between the continuing relief conduit 36a" and the line 66, or the piston 64 may have a throttle gap relative to the cylinder diameter of the working cylinder 65. This gap can also be made separately, by providing a corresponding recess, polished section or bore.

This variant embodiment provides a stepped piston, enabling a pressure ration such that a higher pressure is generated in the work chamber 68 than in the storage chamber 38. Thus this embodiment can be used to increase the pressure in the spring chamber 28 or in the intermediate chamber 44 still further, in which case the additional advantage of hydraulic separation is attained as well.

FIG. 6 shows a detail of a variant embodiment in which with the smallest possible pressure volume, a strong additional closing force upon the valve closing member of the fuel injection valve can be generated with the aid of the diversion impact. The relief conduit 36, or the continuing relief conduit 36a, 36a', 36a", discharges into the pressure chamber 69, which is defined in a cylinder 71 by an end portion 74 of a punch-like extension portion 70 of the injection valve closing member 55 or valve plate 26. The spring chamber 28' surrounding the extension 70 is pressure relieved via a leakage line 72. Between the pressure chamber 69 and the spring chamber 28', there is disposed in the end portion 74 a throttle connection 73, or alternatively by providing that the end portion 74 is guided with play in the cylinder 71, or that a gap therebetween is produced by material-removing machining. The throttle connection 73 prevent the pressure in the pressure chamber 69 from rising excessively high. It also prevents excessive hindrance of the valve needle opening movement, if this embodiment is combined with that shown in FIG. 4. On the other hand, if it is combiend with the embodiment of FIG. 5, the throttle 67 is already provided, and so this particular goal is already accomplished thereby. With this latter embodiment a strong supplementary closing force can be brought to bear on the injection valve closing member at the end of the injection event, by diminishing the inherent elasticity of the hydraulic chamber, for instance the spring chamber 28, thus rendering part of the energy of the diversion impact ineffective.

With the diversion impact introduced directly into the spring chamber 28 in the exemplary embodiment of FIG. 1, or into the intermediate chamber 44 in the exemplary embodiment of FIG. 3, the advantage was attained that the opening behavior of the closing member 21 or of the valve closing member 55 of the injection valve could also be influenced by the working characteristic of the storage piston 40. This advantage was associated nonetheless with the disadvantage that even if the storage chamber 38 was completely evacuated, the pump cylinder 2 could still be made to communicate with the entire volume of the spring chamber 28 and/or the intermediate chamber 44. This volume was considered to be idle or dead volume. In the embodiments of FIGS. 4 and 5, it became possible to disengage these volumes from the pump cylinder. However, these embodiments offered no solution for additionally attaining the first advantage mentioned, that is, dynamically effective pressure variation.

In the exemplary embodiment of FIG. 7, the storage piston 40" is now embodied such that toward the storage chamber 38' it has a frustoconical end face 75. The jacket face 76 of this frustoconical end face 75 comprises a sealing face, for which an annular stub 77, that protrudes into the storage chamber 38' serves as a valve seat. The stub 77 is embodied as an insert into the cylinder guiding the piston 40" and is flush with the cylinder wall; when the storage piston 40" is in contact with it, the stub 77 divides the storage chamber 38' into a first partial storage chamber 78 and a second partial storage chamber 79. The second partial storage chamber 79, like the partial storage chamber 61 of FIG. 5, communicates directly with the pump cylinder 2, while the first partial storage chamber 78 communicates with the continuing relief conduit 36a'''. The first partial storage chamber 78 is defined by the outermost portion 80 of the conical jacket face 76 in the axial direction of the pump piston. This surface 80 serves as a pressure shoulder, by way of which when there is a pressure increase in the spring chamber 28 or intermediate chamber 44 the piston 40" can be deflected out of its position of repose against the stub 77. This deflection takes place particularly whenever the fuel injection valve opens, or whenever the valve closing member is moved into its open position. The fuel that is thereby positively displaced is stored in the storage chamber 38 and can be compensated for with the diversion impact. Thus no fuel fails to be included to provide precise fuel metering because it cannot escape via leakage lines, which were needed in the other exemplary embodiments in particular to avoid excessively high pressure in the spring chamber 28 or the intermediate chamber 44.

In the exemplary embodiment of FIG. 7, a pressure valve closing member 21' of modified form is also provided, which corresponds in its disposition to the exemplary embodiment of FIG. 3 or FIG. 1, but which plunges with a tang 81 into the injection line portion 82 between the chamber 18 and the pump work chamber 35 whenever the pressure valve closing member 21' moves into the closing position. The chamber 44 enclosed on the rear side of the valve closing member 21', as in the exemplary embodiment of FIG. 3, communicates with the spring chamber 28 and via this chamber with the storage chamber 38.

As soon as the effective supply stroke of the pump piston 3 begins, then first the pressure valve closing member 21' is deflected counter to the force of the valve spring 22, until the tang 81 moves all the way out of the injection line portion 82 to effect communication between the pump work chamber 6 and the chamber 18. Only then can the high pressure be propagated, unthrottled, via the continuing injection line 16 to the injection valve. During the opening of the pressure valve closing member 21', the injection line 16, or the volume between the pressure valve closing member and the valve needle 55, is somewhat relieved in this manner, and it must first be filled by the fuel positively displaced by the pump piston. At the same time, the pressure valve closing member 21' continues its deflection movement, until it reaches the stop 49 already described in regard to FIG. 1. This in turn causes a delayed pressure increase in the system at injection onset. In this manner, the course of injection at injection onset can be flattened out in a more differentiated manner to attain an initially lower injection rate, the advantage being that this enables quieter combustion. Biasing the volume behind the valve closing member 21' or the spring chamber 28 causes the storage piston 40" to lift from its seat on the stub 77 at the beginning of injection, so that by the time the diversion impact begins, continuous communication has already been established with the spring chamber 28 or the intermediate chamber 44. With this embodiment, a very rapid pressure buildup in these two chambers is attained, and thus a very rapid end to the injection event. The inertia of the storage piston 40" does not hinder the effectiveness of the diversion impact.

The exemplary embodiment of FIGS. 8 and 9 operates with a unit fuel injector in which the control of the quantity of fuel to be injected per pump piston stroke is effected with the aid of a magnetic valve, which differing from the foregoing embodiments has a valve closing member that experiences pump supply pressure on one side during the entire pump piston supply stroke. With this type of fuel injection apparatus, the storage chamber 38 described in the above embodiments is unnecessary, because the only factor that determines the fuel injection quantity and the instant of injection is the phase while this valve is closed. However, this apparatus also cooperates advantageously with a pressure valve closing member 21" as in the above exemplary embodiments, and the diversion impact is likewise exploited for generating an additional force upon the injection valve closing member and/or the pressure valve closing member.

In FIG. 8, a portion of a fuel injection apparatus is shown in section, again based on a fuel injection apparatus such as that shown by way of example in FIGS. 1 and 4. Once again, this is what is known as a unit fuel injector. In principle the embodiment described in terms of this exemplary pump can also be used for other fuel injection pumps as well. With the unit fuel injector embodiment, however, it is possible to attain the above-described advantages of a short injection time at high injection pressure while avoiding harmful effects being conveyed to the line between the fuel injection pump and the fuel injection valve. All that is shown of the unit fuel injector in the embodiment of FIG. 8 is the pump piston 103, which is driven by means already discussed in the foregoing embodiment and slides in the pump housing 101 in a pump cylinder 102, with which it defines the pump work chamber 106. As in the exemplary embodiment of FIG. 1, the pump housing 101 is adjoined by a first intermediate element 108, in which the pressure valve closing member 101 is disposed in the same embodiment in the guide cylinder 120. The pressure valve closing member 121 has a sealing face cooperating with a conical valve seat 117 and has a pressure shoulder 123, which is exposed to the pressure in the chamber 118 adjoining the valve seat 117 and, when pressure is exerted thereon the pressure valve closing member is displaced against its valve spring as far as a stop 149 at the end of the guide cylinder. A relief and filling conduit 136 also extends within the first intermediate element 108, and the communication of this conduit 136 with the pump work chamber 106 is controlled via a magnetic valve or an electrically controllable valve 84. The electrically controllable valve 84 is controlled by an electric control unit 85 in accordance with engine operating parameters.

In the first intermediate element 108, the relief and filling conduit 136 divides into a first conduit portion 136a and a second conduit portion 86, which discharges into the guide cylinder 120 at its side nearer the stop. The first intermediate element 108 is adjoined by a second intermediate element 87, against which the housing 109 of the fuel injection valve comes to rest and is screwed with a nut similar to the nut 11 of FIG. 1 to form a tightly closed unit comprising the parts 87, 108 and 102. In the second intermediate element 87, the first conduit portion 136a leads into a pressure chamber 169 of the kind already shown in FIG. 7 and enclosed by a punch-like extension portion 170, which is joined to the valve closing member 155 of the fuel injection valve. The valve spring chamber 128 receiving the extension portion 170 and also containing the injection valve closing spring 127 has a throttle connection 173 leading to the pressure chamber 169, or else the pressure chamber 169 has a throttle connection 88 with a fuel supply line 89, which is supplied by a fuel supply pump 90 from a fuel supply tank 91. The fuel supply pump, together with a pressure control valve 92, serves as a fuel supply source of constant pressure, from which the pump work chamber can be supplied with fuel and to which the fuel quantity not needed for injection can flow out. The fuel supply line 89 further communicates with the intermediate chamber 144 enclosed in the guide cylinder 120 by the pressure valve closing member 121, and this intermediate chamber 144 can be made to communicate in turn, via the second conduit portion 86, with the relief and filling conduit 136. In this way, with the electrically controlled valve 84 in an open position, the pump work chamber 106 can be filled with fuel via the relief and filling conduit 136 during the pump piston intake stroke.

The second conduit portion 86, however, is controlled by the jacket face of the pressure valve closing member together with its end edge 93 nearer the stop. In the outset position shown, in which the pressure valve closing member is in contact with the valve seat 117, this end edge has opened the second conduit part 86. This status corresponds to the intake stroke of the pump piston 103. In the ensuing pumping stroke of the pump piston, the pump piston can pump fuel back along the same route to the fuel supply line 89, as long as the electrically controlled valve 84 is opened. At the instant of injection onset, the valve 84 closes the relief conduit 136. The pressure valve closing member opens in response to the increasing pressure in the pump work chamber 106, and the pumped fuel can flow via the fuel injection line 116 to reach the outlet at the fuel injection valve.

Once the desired injection quantity has been attained, then the electrically controlled valve 84 opens the relief conduit 136 again, and the remaining fuel pumped by the pump piston flows directly into the pressure chamber 169; at this instant the pressure valve closing member 121 still has the second conduit portion 86 closed, and thus has also closed the connection with the fuel supply line 89 and with the relief chamber. In the pressure chamber 169, reinforcing the closing movement of the fuel injection valve closing member, a high pressure can build up. With the throttle connection 88 or 173, the pump work chamber is relieved after the injection has been ended. The pressure valve closing member is moved upward to the valve seat 117 by its valve spring, and simultaneously the second conduit portion 86 opens as well. The result is that the entire system, the pressure chamber 169, the intermediate chamber 144 and the relief conduit 136, are relieved toward the low-pressure side of the valve. To enlarge the cross section per stroke unit that is controlled during the movement of the pressure valve closing member, the provision shown in FIG. 9 can be made, in which the second conduit portion 86 also discharges into an annular groove 95 provided in the wall of the guide cylinder 120; this annular groove 95 is likewise controlled by a control edge provided on the jacket face of the pressure valve closing member.

In this embodiment of FIGS. 8 and 9 as well, a very rapid closure of the fuel injection valve is attained at the end of injection, and the end of injection is substantially determined by the buildup of pressure in the pressure chamber 169, not by the relief of the pump work chamber and the ensuing closure of the pressure valve closing member. Based upon the diameter of the punch-like extension portion 170 or its extremity 174 that closes off the pressure chamber, the force acting upon the fuel injection valve closing member can be determined. In so doing, the size of the throttle connection 88 or 173 must also be taken into account. In this exemplary embodiment as well, a very rapid needle closure is thus attained, along with the advantages of the pressure valve closing member described in connection with the foregoing embodiments.

The foregoing relate to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection apparatus for internal combustion engines having a housing, a pump cylinder in said housing, a pump piston operative within said pump cylinder to define with said pump cylinder a pump work chamber in said pump cylinder, said pump work chamber arranged to communicate with a fuel injection valve via a fuel injection line and an annular chamber in said housing; a pressure valve disposed in said fuel injection line arranged to open in a fuel pumping direction, a control valve in said housing, said control valve adapted to provide communication between said pump work chamber and a relief conduit at least beyond the end of an effective supply stroke of said pump piston, said fuel injection line further having a flow cross section defined by a valve seat; a pressure valve closing member of said pressure valve adapted to be guided in a guide cylinder and arranged to cooperate with said valve seat, said closing member including a rear chamber, and a sealing face which extends out of said guide cylinder into said annular chamber adapted to communicate with said fuel injection line said pressure valve closing member further including a pressure shoulder, and a rear side which is loaded by a valve spring in said rear chamber, said rear side adapted to cooperate with a stop to thereby define a stroke of said pressure valve closing member, and further that the fuel flowing out of said control valve via said relief conduit is pumped at least indirectly into said rear chamber enclosed in said guide cylinder by said rear side of said pressure valve closing member.

2. A fuel injection apparatus as defined by claim 1, in which said relief conduit communicates with a storage chamber defined by a cylinder and a wall of a piston of said control valve adjustable counter to a restoring force, and a control valve chamber is defined between a rear extremity of said piston and a closure means, which can be relieved at least via a throttle connection.

3. A fuel injection apparatus for internal combustion engines having a housing, a pump cylinder in said housing, a pump piston operative within said pump cylinder to define with said pump cylinder a pump work chamber, the pump work chamber being arranged to communicate with a fuel injection valve via a fuel injection line extending within said housing, a pressure valve disposed in said fuel injection line to open in a fuel pumping direction, a control valve in said housing which allows said pump work chamber to communicate with a relief conduit in said housing at least for a duration in excess of an effective supply stroke of the pump piston, said control valve further communicates with said relief conduit through which fuel is pumped at least indirectly into a pressure chamber, and a wall partially defining said pressure chamber partly forms a pressure face adapted for connection to a valve needle of a fuel injection nozzle, said pressure face becoming effective upon closing movement of said valve needle.

4. A fuel injection apparatus as defined by claim 3, in which said fuel injection line has a flow cross section defined by a valve seat, a pressure valve closing member which cooperates with said valve seat, said pressure valve closing member being tightly guided in a guide cylinder of the pressure valve, the closing member having a front extremity provided with a sealing face and being adapted to extend out of the guide cylinder into an annular chamber communicating with said fuel injection line, said pressure valve closing member further having a pressure shoulder and a rear extremity biased by a valve spring and arranged to cooperate with a stop means and the pressure chamber communicates with an intermediate chamber defined in the guide cylinder by the rear extremity of the pressure valve closing member.

5. A fuel injection apparatus as defined by claim 4, in which a throttle means is disposed in a connection between said relief line and at least one of the pressure chamber and the intermediate chamber defined in the guide cylinder.

6. A fuel injection apparatus as defined by claim 1, in which said relief conduit extends from the pump work chamber to a storage chamber defined by a cylinder and a wall of a piston adjustable due to fuel pressure counter to a restoring force applied to a rear extremity of said piston and adjustment of the wall causes fuel to flow out via the relief conduit allowing fuel to be pumped into at least one of the pressure chamber and the intermediate chamber.

7. A fuel injection apparatus as defined by claim 3, in which said releif conduit extends from the pump work chamber to a storage chamber defined by a cylinder and a wall of a piston adjustable due to fuel pressure counter to a restoring force applied to a rear extremity of said piston and adjustment of the wall causes fuel to flow out via the relief conduit allowing fuel to be pumped into at least one of the pressure chamber and the intermediate chamber.

8. A fuel injection apparatus as defined by claim 6, in which at least a portion of the rear extremity of said piston defines a work chamber from which a connecting line extends to at least one of the pressure chamber and the intermediate chamber for indirectly pumping fuel flow therefrom via the relief conduit.

9. A fuel injection apparatus as defined by claim 7, in which at least a portion of the rear extremity of said piston defines a work chamber from which a connecting line extends to at least one of the pressure chamber and the intermediate chamber for indirectly pumping fuel flow therefrom via the relief conduit.

10. A fuel injection apparatus as defined by claim 7, in which said piston comprises a storage piston displaceable in a closed cylinder counter to a restoring spring.

11. A fuel injection apparatus as defined by claim 10, in which said storage piston has a sealing face oriented toward said storage chamber, when said piston is in contact with the valve seat, said sealing face is arranged to cooperate with said valve seat to divide said storage chamber into a first partial storage chamber communicating with at least one of the pressure chamber and the intermediate chamber and into a second partial storage chamber communicating via the relief conduit with the pump cylinder.

12. A fuel injection apparatus as defined by claim 11, in which both said first and second partial storage chambers are defined by a portion of a front face of the piston and said valve seat.

13. A fuel injection apparatus as defined by claim 12, in which said front face of said storage piston is formed in a truncated conical shape having a jacket face comprising a sealing face, which cooperates with an annular stub protruding into the storage chamber, said annular stub serving as said valve seat.

14. A fuel injection apparatus as defined by claim 14, in which said annular stub comprises an insert in the cylinder receiving the storage piston.

15. A fuel injection apparatus as defined by claim 9, further comprising the storage piston is arranged to move a second piston of a smaller diameter by means of which a second piston work chamber is defined within a working cylinder which allows for indirectly pumping fuel exiting via said relief conduit to communicate via a continuing relief conduit with at least one of the pressure chamber and the intermediate chamber, said continuing relief conduit being relievable via a throttle.

16. A fuel injection apparatus as defined by claim 3, in which said pressure chamber is comprised of a spring chamber arranged to receive an injection valve closing spring comprising a compression spring.

17. A fuel injection apparatus as defined by claim 3, in which said pressure chamber is defined in a cylinder in part via a punch-like extension arranged to be actuated toward a valve spring of said fuel injection valve by the valve closing member thereof.

18. A fuel injection apparatus as defined by claim 17, in which said pressure chamber is arranged to be relieved via a relief throttle.

19. A fuel injection apparatus as defined by claim 18, in which said relief throttle is disposed between a cylindrical jacket face of the punch-like extension and a wall of the cylinder and said relief throttle discharges into the spring chamber of the fuel injection valve.

20. A fuel injection apparatus as defined by claim 3, in which said fuel injection line has a flow cross section defined by a valve seat arranged to cooperate with a pressure valve closing member tightly guided within a guide cylinder, said pressure value closing member having a front extremity provided with a sealing face and adapted to extend out of the guide cylinder into a chamber communicating with the fuel injection line and further having a pressure shoulder and a rear extremity biased by a valve spring arranged to cooperate with a stop means defining a stroke of the pressure valve closing member, said relief conduit being adapted for filling and being relieved by communicating with a fuel supply source with communicates with said pump work chamber, respectively to fill during an intake stroke of the pump piston and to be relieved via control of a valve during a supply stroke of the pump piston, the relief conduit being divided intermediately into two separate relief conduits, a first conduit portion of which leads into a pressure chamber allowing communication to a throttle disposed upstream thereof in a relief flow direction and a second conduit portion of which leads into said guide cylinder, an entry aperture of the second conduit portion into said guide cylinder being controlled by said pressure valve closing member which, upon opening of the fuel injection line, blocks said entry aperture.

21. A fuel injection apparatus as defined by claim 20, in which said pressure valve closing member comprises a hollow piston in an interior of which a valve spring is disposed, and the second conduit portion discharges radially through an inner wall of a portion of the guide cylinder near said stop means and is closed off by a control edge disposed on a circumferential wall of said hollow piston when said hollow piston comes into contact with the stop means.

22. A fuel injection apparatus as defined by claim 21, in which said first conduit portion discharges into an annular groove in a wall of the guide cylinder.

23. A fuel injection apparatus as defined by claim 20, in which said pressure chamber is defined in a cylinder in part by a punch-like extension arranged to be actuated toward a valve spring of the fuel injection valve by the valve closing member thereof.

24. A fuel injection apparatus as defined by claim 20, in which a pressure shoulder of the pressure valve closing member is acted upon by pressure prevailing in the fuel injection line between the injection valve and the pressure valve closing member.

25. A fuel injection apparatus as defined by claim 24, in which said pressure shoulder is adjoined by a cylindrical tang, which is arranged to extend into the fuel injection line leading to the pump work chamber in a closing position of the pressure valve closing member.

26. A fuel injection apparatus as defined by claim 4, in which said pressure chamber is relievable via a throttled cross section.

* * * * *